_United States Patent Office_

3,104,242
Patented Sept. 17, 1963

3,104,242
2-PHENYL-6-α-NAPHTHYL-4,7-DIAMINOPTERIDINE
Thomas S. Osdene, West Chester, Pa., assignor to American Home Products Corporation, New York, N.Y., a corporation of Delaware
No Drawing. Filed May 5, 1961, Ser. No. 107,935
1 Claim. (Cl. 260—251.5)

This invention relates to novel pteridine compounds. More particularly, it relates to novel 2,6-diaryl-4,7-diaminopteridines. The novel pteridines of this invention are valuable by reason of their unusual and useful pharmacological properties. These compounds exhibit diuretic and anti-inflammatory action. Their value as diuretics is considerably enhanced by the fact that they increase the excretion of sodium ion without significantly increasing potassium excretion, and that the excretion of sodium is almost exactly balanced by chloride excretion. Further advantages are their extremely low toxicity and absence of anti-folic acid activity.

The compounds of this invention have the general formula

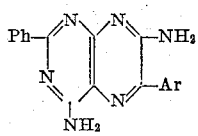

in which Ph represents a phenyl group and Ar represents an aryl group such as a phenyl group, a naphthyl group, or a phenyl or naphthyl group substituted by lower alkyl, lower alkoxy, amino, dialkanolamino, or halogen.

The compounds of this invention are easily prepared by reaction of 4,6-diamino-5-nitroso-2-phenylpyrimidine with an arylacetonitrile or a suitably ring-substituted arylacetonitrile. In most cases they may be prepared by adding the above reactants in approximately equimolar ratio to an alcoholic solution of an alkali metal alkoxide, heating the mixture for a short time between about 50 and 200° C., preferably about 65 to 100° C., cooling, and filtering off the pteridine product. Instead of using an alcoholic solution as aforesaid, I can, alternatively, employ ethylene glycol monomethyl ether or ethylene glycol monoethyl ether as reaction media. In most cases, however, I prefer to use methanol or ethanol as the reaction medium.

The 2,6-diaryl-4,7-diaminopteridines of this invention are sparingly soluble in water, most organic solvents, and aqueous acids, but may usually be recrystallized from aqueous dimethylformamide.

The pteridines of this invention are high melting, very stable crystalline solids. They are colored, pale yellow to dark yellow, and fluoresce strongly even in daylight. Because of this unusual fluorescence they are valuable as optical brighteners in inks and pigments.

The following examples illustrate how the pteridines of this invention may be prepared.

EXAMPLE 1

*4,7-Diamino-2,6-Diphenylpteridine*

To a solution of 0.5 g. of sodium in 250 ml. of absolute ethanol was added 8.6 g. of 4,6-diamino-5-nitroso-2-phenylpyrimidine, followed by 5.0 ml. redistilled phenylacetonitrile. The mixture was brought to boiling point, at which time the color of the solution turned from green to brown, and a brown precipitate was deposited. After cooling, the precipitate was filtered from the solution and dried, wt.=8.8 g. (70% theory). Several recrystallizations from aqueous dimethylformamide yielded 4,7-diamino-2,6-diphenylpteridine as yellow crystals, M.P. above 360°.
Analysis.—Calculated: C=68.77; H=4.49; N=26.75.
Found: C=68.47; H=4.37; N=26.49.

EXAMPLE 2

*4,7-Diamino-2-Phenyl-6-o-Tolylpteridine*

To a solution of 0.1 g. sodium in 100 ml. absolute ethanol was added 2.15 g. 4,6-diamino-5-nitroso-2-phenylpyrimidine, followed by 1.6 g. o-tolylacetonitrile. The mixture was boiled under reflux for 75 mins. during which time a yellow precipitate was deposited. After cooling, the precipitate was filtered from the solution and dried, wt.=2.1 g., M.P. 325–326°. Two recrystallizations from aqueous dimethylformamide gave 4,7-diamino-2-phenyl-6-o-tolylpteridine as yellow crystals, M.P. 326°.
Analysis.—Calculated: C=69.49; H=4.91; N=25.60.
Found: C=69.36; H=4.82; N=25.76, 25.90.

EXAMPLE 3

*4,7-Diamino-2-Phenyl-6-m-Tolylpteridine*

To a solution of 0.05 g. sodium in 50 ml. of absolute ethanol was added 1.07 g. of 4,6-diamino-5-nitroso-2-phenylpyrimidine, followed by 0.75 ml. m-tolylacetonitrile. The mixture was boiled under reflux for 30 mins. A precipitate formed when the mixture reached boiling point. After cooling, the precipitate was filtered from the solution and dried, wt.=1.33 g. (81% theory). Several recrystallizations from aqueous dimethylformamide yielded 4,7-diamino-2-phenyl-6-m-tolylpteridine as yellow crystals, M.P. 334°.
Analysis.—Calculated: C=69.49; H=4.91; N=25.60.
Found: C=69.62; H=5.17; N=25.30, 25.35.

EXAMPLE 4

*4,7-Diamino-2-Phenyl-6-p-Tolylpteridine*

To a solution of 0.05 g. of sodium in 50 ml. of absolute ethanol was added 1.07 g. of 4,6-diamino-5-nitroso-2-phenylpyrimidine, followed by 0.75 ml. of p-tolylacetonitrile. The mixture was brought to the boiling point at which time the color turned from green to yellowish brown. The mixture was boiled under reflux for 30 mins. during which time a yellowish precipitate was deposited. After cooling, the precipitate was filtered from the solution, wt.=1.3 g. (79% theory), M.P. 353°. Several recrystallizations from aqueous dimethylformamide gave 4,7-diamino-2-phenyl-6-p-tolylpteridine as yellow crystals, M.P. 358°.
Analysis.—Calculated: C=69.49; H=4.91; N=25.60.
Found: C=69.73, 69.89; H=5.04, 4.83; N=25.76.

EXAMPLE 5

*4,7-Diamino-6-(3,4-Dimethylphenyl)-2-Phenylpteridine*

To a solution of 0.5 g. of sodium in 250 ml. absolute ethanol was added 8.6 g. 4,6-diamino-5-nitroso-2-phenylpyrimidine, followed by 7 g. 3,4-dimethylphenylacetonitrile. The mixture was boiled under reflux for 30 mins. A thick yellow precipitate was formed after 2 mins. of boiling. The mixture was cooled, and the the precipitate was filtered off and dried, wt.=7.0 g., M.P. 317–318°. Two recrystallizations from aqueous dimethylformamide yielded 4,7-diamino-6-(3,4-dimethylphenyl)-2-phenylpteridine, M.P. 320°.
Analysis.—Calculated: C=70.15; H=5.30; N=24.55.
Found: C=70.56, 70.57; H=5.28, 5.20; N=23.59, 23.77.

EXAMPLE 6

*4,7-Diamino-6-(p-Methoxyphenyl)-2-Phenylpteridine*

To a solution of 0.5 g. of sodium in 250 ml. absolute ethanol was added 8.6 g. 4,6-diamino-5-nitroso-2-phenylpyrimidine, followed by 6.5 g. p-methoxyphenylacetonitrile. The mixture was brought to the boiling point at which time a yellow precipitate was deposited. After refluxing for 15 mins. the mixture was cooled, and the material was removed by filtration, wt.=9.0 g. (65% theory), M.P. 349–350° d. Recrystallization from aqueous dimethylformamide gave 4,7-diamino-6-(p-methoxyphenyl)-2-phenylpteridine, M.P. 357° d.

*Analysis.*—Calculated: C=66.26; H=4.68; N=24.41. Found: C=66.30; H=4.76; N=24.31, 24.49.

EXAMPLE 7

*4,7-Diamino-6-(p-Isopropylphenyl)-2-Phenylpteridine*

To a solution of 0.5 g. of sodium in 250 ml. absolute ethanol was added 8.6 g. 4,6-diamino-5-nitroso-2-phenylpyrimidine, followed by 7.5 g. p-isopropylphenylacetonitrile. The mixture was boiled under reflux for 20 mins. during which time a yellow precipitate was deposited. After cooling, the material was filtered from the solution and dried, wt.=7.65 g., M.P. 358–359°. Two recrystallizations from aqueous dimethylformamide gave 4,7-diamino-6-(p-isopropylphenyl)-2-phenylpteridine as yellow crystals.

*Analysis.*—Calculated: C=70.76; H=5.66; N=23.58. Found: C=70.76; H=5.78; N=23.24.

EXAMPLE 8

*4,7-Diamino-6-(p-Chlorophenyl)-2-Phenylpteridine*

To a solution of 0.5 g. of sodium in 300 ml. absolute ethanol was added 8.6 g. of 4,6-diamino-5-nitroso-2-phenylpyrimidine, followed by 7 g. of p-chlorophenylacetonitrile. The mixture was boiled under reflux for 30 mins. during which time a thick yellow precipitate was formed. After cooling, the material was filtered from the solution and dried, wt.=12.73 g. (91% theory), M.P. above 360°. Recrystallization from aqueous dimethylformamide yielded 4,7 - diamino - 6 - (n - chlorophenyl)-2-phenylpteridine.

EXAMPLE 9

*4,7-Diamino-6-(p-Aminophenyl)-2-Phenylpteridine*

To a solution of 1.5 g. of sodium in 250 ml. absolute ethanol was added 8.6 g. 4,6-diamino-5-nitroso-2-phenylpyrimidine and 8.0 g. p-aminophenylacetonitrile hydrochloride. The mixture was stirred and boiled under reflux for 30 mins. A thick precipitate was rapidly deposited. After cooling, the material was removed by filtration, washed with water and dried, wt.=10.1 g., M.P. 348°. Two recrystallizations from aqueous dimethylformamide afforded 4,7 - diamino - 6-(p-aminophenyl)-2-phenylpteridine, M.P. 352–354°.

*Analysis.*—Calculated: C=65.64; H=4.59; N=29.77. Found: C=65.62; H=4.47; N=29.27.

EXAMPLE 10

*p-Di(2-Hydroxyethyl)Aminophenylacetonitrile*

Fifty and four-tenths of p-aminophenylacetonitrile hydrochloride was suspended in 375 ml. of cold distilled water, and to the mixture was added 40 ml. of ethylene oxide. The mixture was shaken by hand for 5 mins. after which it was stoppered and allowed to stand overnight at room temperature. After cooling in an ice bath an oil separated which on scratching solidified. The precipitate was removed by filtration, washed with ice water and dried. Recrystallization from methylene chloride yielded p - di(2 - hydroxyethyl)aminophenylacetonitrile, M.P. 87–88°, weight=34 g. (51% theory).

*Analysis.*—Calculated: C=65.54; H=7.32; N=12.72. Found: C=65.92; H=7.09; N=12.90.

EXAMPLE 11

*4,7 - Diamino - 6 - (p - Di(2 - Hydroxyethyl)Aminophenyl)-2-Phenylpteridine*

To a solution of 0.5 g. sodium in 250 ml. absolute ethanol was added 8.6 g. 4,6-diamino-5-nitroso-2-phenylpteridine, followed by p-di(2-hydroxyethyl)aminophenylacetonitrile. The mixture was boiled under reflux for 10 mins. during which time a thick precipitate came out of solution. After cooling, the material was filtered from the solution and dried, wt.=13.4 g., M.P. 250°. Two recrystallizations from aqueous dimethylformamide gave 4,7-diamino-6(p-di(2-hydroxyethyl)aminophenyl)-2-phenylpteridine, M.P. 275–276°.

*Analysis.*—Calculated: C=63.29; H=5.55; N=23.49. Found: C=63.45; H=5.49; N=23.32.

EXAMPLE 12

*4,7-Diamino-6-α-Naphthyl-2-Phenylpteridine*

To a solution of 0.5 g. sodium in 250 ml. absolute ethanol was added 8.6 g. 4,6-diamino-5-nitroso-2-phenylpyrimidine, followed by 7.3 g. 1-naphthaleneacetonitrile. The mixture was boiled under reflux for 30 mins. during which time a yellow precipitate was deposited out of solution. After cooling, the material was removed by filtration and dried, wt.=10.0 g. Several recrystallizations from aqueous dimethylformamide gave 4,7-diamino-6-α-naphthyl-2-phenylpteridine, M.P. 317°.

*Analysis.*—Calculated: C=72.52; H=4.40; N=23.08. Found: C=72.74; H=4.67; N=23.04.

I claim:

2-phenyl-6-α-naphthyl-4,7-diaminopteridine.

References Cited in the file of this patent

UNITED STATES PATENTS

| | | |
|---|---|---|
| 2,665,275 | Campbell et al. | Jan. 5, 1954 |
| 2,667,486 | Cain | Jan. 26, 1954 |
| 2,978,482 | Weinstock | Apr. 4, 1961 |
| 3,028,387 | Weinstock | Apr. 3, 1962 |

OTHER REFERENCES

Spickett et al.: J. Chem. Soc., London (1954), pages 2887–95.

Osdene: J. Chem. Soc., London (1955), pages 2036–8.

Boon: J. Chem. Soc., London (1957), page 2156.